United States Patent Office 3,725,040
Patented Apr. 3, 1973

3,725,040
METHOD OF OPERATING A VARIABLE FLAME OXY-FUEL BURNER
Robert D. Jones, Allentown, Pa., assignor to Air Products and Chemicals, Inc., Allentown, Pa.
Original application May 28, 1968, Ser. No. 733,100, now Patent No. 3,578,793, dated May 18, 1971. Divided and this application July 23, 1970, Ser. No. 63,995
Int. Cl. C21c 7/00
U.S. Cl. 75—60      4 Claims

ABSTRACT OF THE DISCLOSURE

An oxy-fuel burner for use in a metallurgical furnace is disclosed which can be controlled to regulate the configuration of the burner flame to provide a flame shape varying from a wide "umbrella" shaped flame to a narrow "pencil" shaped flame. Several methods of using such burners in metallurgical furnaces are also disclosed.

CROSS REFERENCE TO RELATED APPLICATION

This is a division of copending application Ser. No. 733,100 filed May 28, 1968, now U.S. Pat. 3,578,793; which issued May 18, 1971.

BACKGROUND OF THE INVENTION

The availability of tonnage oxygen at a reasonable cost has brought about a multitude of significant innovation in the metallurgical field. The injection of pure oxygen can increase the speed of metallurgical melting and/or refining operations, reduce the cost of such operations and improve the quality of the desired product. New furnaces, such as the L-D converter, have been developed and older furnaces, such as open furnaces, and electric arc furnaces are being modified to take advantage of these features. In addition, new processes involving the use of oxygen have been developed for the production of both ferrous metals, e.g., steel and steel alloys, and nonferrous metals, e.g., copper, U.S. Letters Patent No. Re. 26,364, for example, discloses several processes involving the use of oxy-fuel burners for the production of either ferrous or nonferrous metals in various furnaces.

It has now been discovered that the optimum shape of a flame from an oxy-fuel burner depends not only on the type of furnace employed and the location of the burner in the furnace, but also on the material being processed, the condition of the material and the desired objective. For example, it has been found that one flame shape may be most beneficial for melting cold charges, whereas, other shapes may be more beneficial in later stages of the process wherein, for example, more narrow, higher velocity flames may be required to penetrate the slag layer. Prior to the present invention, all known metallurgical burners were of fixed, nonvariable flame shape except for the burner disclosed in U.S. Pat. 3,234,670 wherein a variable shape flame is produced by movement of a flame orifice relative to a cup structure into which and through which the flame is projected. While this type of burner does permit a certain degree of variation of the flame shape, the maximum width of the flame is severly limited by the surrounding cup structure. In addition, the movement of the flame orifice relative to a surrounding cup requires that a positive and negative pressure seal be provided, preferably in the forward end of the burner, to prevent the explosive oxygen-fuel mixture from leaking rearwardly into the back of the burner and possibly exploding therein. Such effective seals are very difficult to provide while still permitting easy relative movement between the burner structure and the cup. Even more importantly, it is virtually impossible to attain any reasonable life of forward position seals due to the extremely hot and oxidizing conditions to which the forward end burner is subjected in a metallurgical furnace.

OBJECTS AND SUMMARY OF THE INVENTION

Accordingly, an object of the present invention is to provide a new and improved variable flame, oxy-fuel burner which overcomes the above indicated difficulties.

Another object of the invention is to provide a variable flame, oxy-fuel burner which is capable of operating for extended periods without danger of fuel and/or oxygen leakage into the rear of the burner.

Still another object of the invention is to provide an oxy-fuel burner which can be operated to produce flame shapes varying from a very wide "umbrella" flame shape to a narrow "pencil" flame shape, as well as, to provide certain optimum methods of using such a burner in metallurgical furnaces.

In brief, the present burner is composed of only three main components. These are (1) an outer jacket having an annular ring portion, (2) an intermediate, annular ring sometimes referred to as a "separator ring," and (3) a central bluff body. These three main components cooperate to vary the orientation of the flame orifice and the resulting shape of the flame. This is accomplished by movement of the bluff body and separator ring together relative to the sleeve ring as will be more fully described hereinafter.

DETAILED DESCRIPTION

Figure 1:
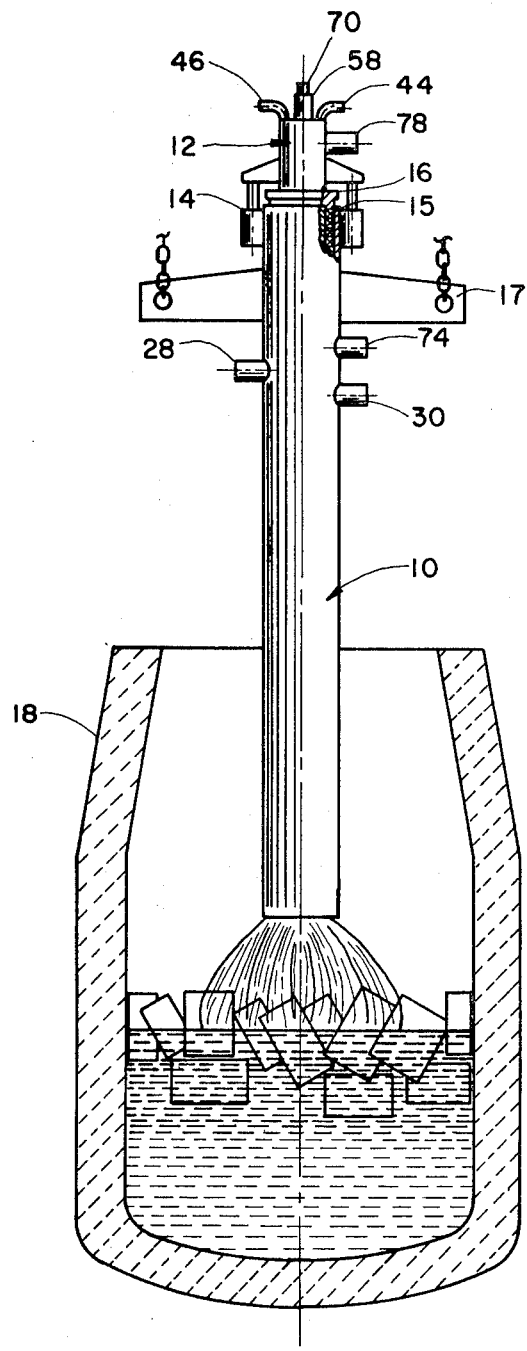
FIG. 1 is a simplified illustration of the complete variable flame burner operating in one type of metallurgical furnace.

Referring first to FIG. 1, the complete burner includes a lower, large diameter portion 10 and an upper, smaller diameter portion 12 the latter of which is adapted to telescope into and out of the larger portion by suitable actuating means such as, for example, pneumatic or hydraulic cylinders 14. A simple packing gland 15 including a retainer 16 is provided at the extreme rearward end of the burner between telescoping portions 10 and 12. A chain hoist system 17 is provided in order to raise and lower the entire burner relative to an associated furnace; a basic oxygen or B.O.F. type furnace 18 being shown for purposes of example. Of course, many other types of mechanical systems may be employed in place of the cylinders and/or the chain hoist system.

Figure 2:
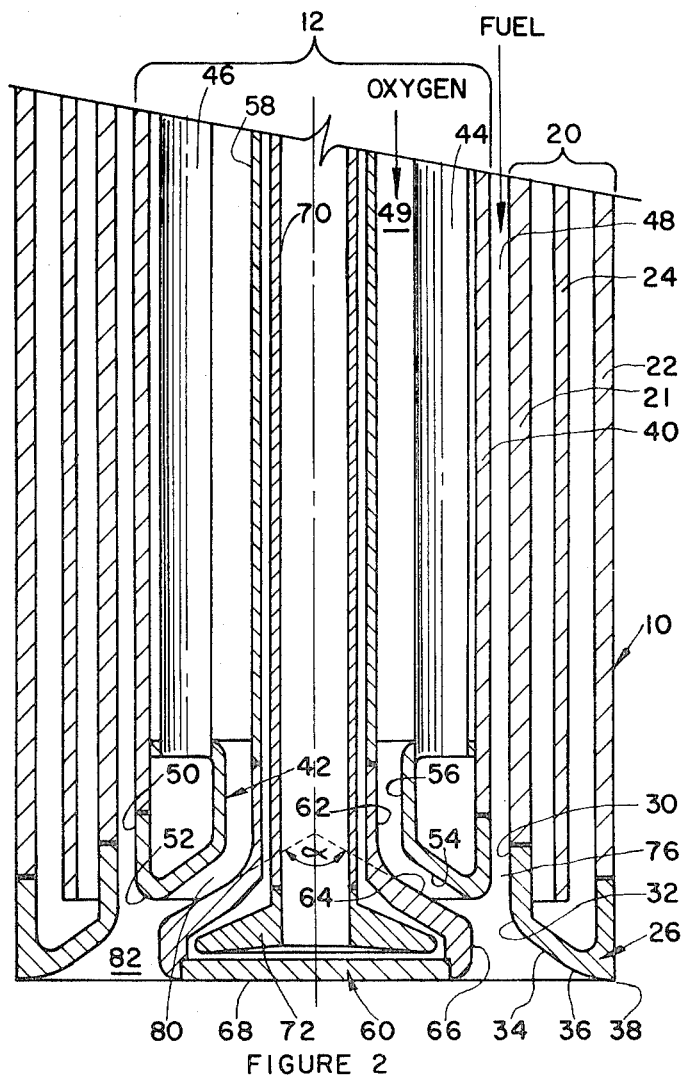
FIG. 2 is a fragmentary, cross-sectional view of the forward end of the burner shownning one preferred manner of detailed construction.

Referring now to FIG. 2, the large diameter portion 10 consists of an outer, water-cooled jacket generally denoted by numeral 20. More particularly, jacket 20 is composed of a pair of elongated, concentric, spaced-apart sleeves 21, 22 between which there is provided a third sleeve forming a baffle 24. At the forward or lower end of the burner as shown in FIG. 2, an annular, hollow jacket ring 26 is attached to the ends of sleeves 21, 22 so as to form an end closure for the jacket.

As shown in FIG. 1, cooling water is supplied to jacket 20 through an inlet pipe 28 such that it flows downwardly between inner sleeve 21 and baffle 24. The water then flows under the end of the baffle in hollow jacket ring 26 and upwardly between outer sleeve 22 and baffle 24 from which it exits through outlet pipe 30. In actual furnace tests, this particular cooling arrangement has been found to produce superior cooling of the outer sleeve 22 and the jacket ring 20 which are subjected to the highest temperature levels.

At this point, it should be noted that jacket ring 26 is of particular shape which is of critical importance to the burner operation. That is, the radially inner surface of the ring includes an axial surface 30, a smoothly curved surface 32, a straight diverging surface 34 and a second smoothly curved surface 36 which terminates at sharp corner 38. As will be subsequently explained in greater detail, this shape produces what is known as the Coanda effect and this materially contributes to the unique operation of the burner.

Referring now to both of FIGS. 1 and 2, it will be noted that the smaller diameter portion 12 is composed of an elongated sleeve 40 which is concentrically disposed within and spaced from jacket sleeve 21; packing gland 15 serving as a fluid seal between sleeves 40 and 21. A hollow annular ring 42 is secured to the end of sleeve 40 and a pair of water cooling pipes 44, 46 are connected so as to supply and withdraw cooling water to this ring. The upper ends of these pipes are shown in FIG. 1 and it will be apparent that water flows down one pipe, around the interior of annular ring 42, and upwardly through the other pipe from which it is discharged. As stated hereinabove, ring 42 is conveniently referred to as a separator ring for reasons which will subsequently become apparent. The shape of separator ring 42 is also important to the proper operation of the burner and, in this regard, it will be noted that this ring includes an outer axial surface 50, a sharply rounded corner 52, a flat diverging surface 54 and an inner axial surface 56.

Referring now to the central portion of FIG. 2, there is provided an elongated pipe 58 at the lower end of which there is provided a hollow bluff body 60 which is generally in the shape of a doorknob. That is, the bluff body includes an axial surface 62, a flat divergent surface 64, a rounded edge 66 and a flat face 68. It has been found that the angle of divergence α should be between 90° and 150° and, most preferably, about 120°. A second pipe 70 is disposed within pipe 58 and a circular baffle 72 is secured to the end of pipe 70 within the hollow interior of bluff body 60. As shown in FIGS. 1 and 2, cooling water is supplied to inner pipe 70 through which it flows downwardly and then around baffle 72 and upwardly between pipes 70 and 58 from which it is discharged.

From the foregoing description, it will be apparent that each of three basic components is internally water cooled and that these components collectively define annular gas passages between them. More specifically, sleeves 21 and 40 define an annular passage 48 through which fuel such as, for example, natural gas is passed to the forward end of the burner; such fuel gas being supplied at the rear of the burner through fuel inlet pipe 74. Thus, the fuel gas flows downwardly through annular passage 48 and then through an annular nozzle passage 76 formed between annular surfaces 30, and 50. Similarly, a second annular gas passage 49 is formed between sleeve 40 and pipe 58. This passage is used to supply oxygen from an inlet pipe 78 down to the forward end of the burner at which point it passes through an annular nozzle passage 80 formed by surfaces 54 and 64. As a result, the fuel gas and oxygen are mixed in the annular region indicated by numeral 82 from which they issue as an annular jet of flame.

OPERATION TO VARY FLAME SHAPE

From the foregoing structural description, it will be apparent that the fuel gas flowing through annular nozzle 76 is intercepted and mixed with higher velocity oxygen flowing through annular nozzle 80 such that a combustible mixture is present in the annular orifice area indicated as 82. Of course, it will be understood that the actual position of the flame front is subject to considerable variation depending upon, for example, the velocity of each of the oxygen and fuel, the type of fuel and the pressure conditions existing in the furnace. Therefore, it is to be understood that although annular space 82 is referred to as the flame orifice, the actual flame front may vary from a position in the region of the throat formed by jacket ring surface 32 and edge 66 of the bluff body, to a position which is beyond the forwardmost edge 38, depending upon the above indicated conditions of operation. However, this variation in the actual position of the flame front in no way effects the ability to produce the flame shapes as will now be described with reference to FIGS. 3A, 3B, and 3C.

Figure 3A:
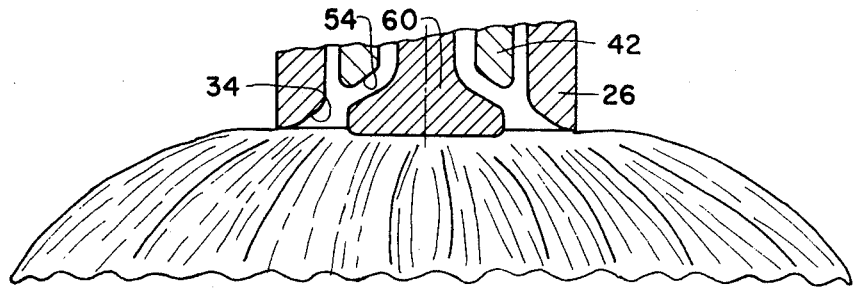
FIGS. 3A, 3B, and 3C are simplified, schematic illustrations showing the relative positioning of the main burner components and the resultant 3 basic flame shapes which may be produced.

Referring first to FIG. 3A, the position of bluff body 60 is shown to be in its forwardmost position with respect to the location of jacket ring 26. Also, as previously described, separator ring 42 is connected to and moves with the movement of the small diameter portion 12. Thus, it will be noted that surface 54 of the separator ring is in direct alignment with surface 34 of jacket ring 26. That is, these two flat surfaces lie along a common straight line. In this position, the flame is projected out of orifice 82 with a predominantly radial component. As a result, the flame jets out substantially purely radially and forms a very wide, annular flame which looks very much like the shape of an umbrella. In this condition, the shape of jacket ring 26 plays a very important role in that the boundary layer of the fluid effluent strongly tends to adhere to and follow the smoothly curved surface of ring 26 until it reaches sharp edge 38. As previously stated, this boundary layer phenomenon is known and is called hte Coanda effect, however, the utilization of this phenomenon in a burner to produce a wide umbrellalike flame shape is believed to be unique to the present invention. In addition, it should be noted, that although the illustrated embodiment of the invention shows a sharp corner 38, it is within the scope of the invention to round corner 38 so that the fluid effluent actually issues with a predominantly radial but slightly rearward component of velocity. Such flames have actually been produced and the result is that the axial length of the umbrella flame is slightly shortened. Thus, even shorter, wider flames than that shown in FIG. 3A can be achieved by this technique.

Figure 3B:
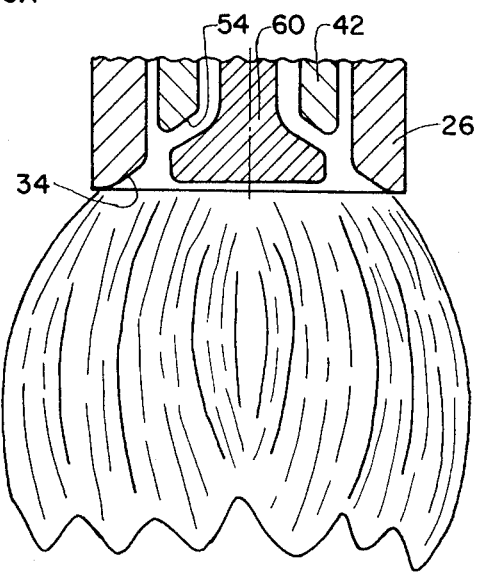

Referring now to FIG. 3B, it will be apparent that both the separator ring 42 and bluff body 60 have been retracted slightly from the position shown in FIG. 3A. As a result, the fluid does not have a direct line of flow from surface 54 to surface 34. Thus, the Coanda effect is not established and the fluid effluent is deflected slightly forwardly by the jacket ring 26. Of course, there still is some radial component of velocity, but this is approximately equal to the axial component. In this condition, the flame blossoms out and forms a shape which is like a ball; i.e., it diverges radially outwardly but then converges slightly due to internal low pressure so as to form a rounded, blossom or ball-like shape.

Figure 3C:
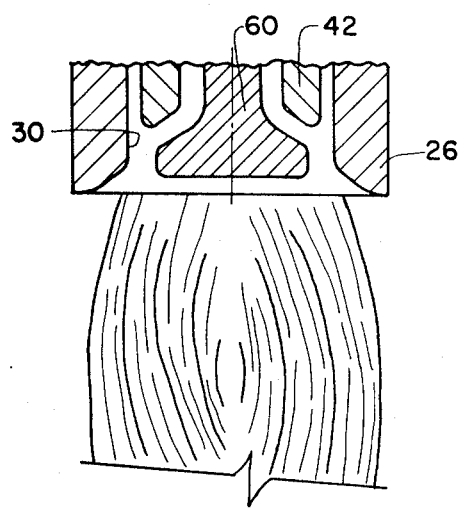

The third basic flame shape is illustrated in FIG. 3C wherein it will be apparent that the separator ring and the bluff body have been retracted still further relative to ring 26. In this condition, the axial surface 30 of the jacket ring 26 serves to remove the radial velocity component and collimates the fluid effluent into a relatively narrow, axially directed flame which is relatively sharply pointed and pencil-like in appearance. In contrast to the umbrella and ball shaped flames which have a relatively low axial velocity, the pencil shape flame has a much higher axial velocity and, therefore, has greater penetration capability.

BURNER OPERATION IN FURNACES

The above described burner has been operated in a metallurgical furnace wherein it produced a number of substantial benefits. In an open hearth furnace for example, the burner was first used to assist in melting solid scrap and pig iron which had been charged into the furnace. During this melting portion of the process, the burner was operated as shown in FIG. 3A. Also, it was operated as shown in FIG. 3B, as well as in intermediate positions. In any event, it was operated with a relatively wide flame so as to melt as large a diameter hole as possible in the solid charge without undue harmful effects to the furnace lining. As melting proceeded, the burner was repeatedly lowered by the chain hoist so that the flame was substantially always in direct contact with the solid charge as it melted down. As a result, the melting period was significantly reduced as compared with conventional open hearth practices. In addition, the burner was used later in the process during the refining period. At this time, the burner was operated as shown in FIG. 3C such that the concentrated, high velocity flame was able to penetrate the slag layer and directly contact the molten metal undergoing refining. As a result, the bath temperature was increased more quickly and, by suitably increasing the oxygen to fuel ratio, the rate of decarburization was increased. Thus, there was a decided over-all benefit in adjusting the flame shape at different periods of the steel making process.

From the foregoing description of burner operation, it is apparent that similar benefits may be obtained in various types of furnaces including both ferrous and nonferrous types. For example, in a B.O.F. furnace charged with at least a partly solid charge, the present burner may be used for preheating and/or melting such as shown in FIG. 1. Depending upon the size of the burner and the diameter of the furnace, the wide flame used for preheating or melting may be either the umbrella shape, the ball shape, or some intermediate shape consistent with the furnace and burner size. Thereafter, in the refining period, the burner may be operated with a relatively more narrow flame when slag penetration is required. Thus, the burner may be used to produce the umbrella flame for melting and the ball flame for refining. On the other hand, if the umbrella flame is too wide for a given furnace diameter, the burner may be operated to produce a ball flame during melting and a pencil flame during refining.

Lastly, it must be emphasized that the three flame shapes illustrated in FIGS. 3A, 3B, and 3C are merely illustrative of three basic shapes which can be produced and that these are in no way limiting since an infinite number of variations are obviously possible by proper relative movement of the three main components. In addition, it is to be understood that the above described apparatus is inherently capable of operating as an oxygen lance merely by shutting off the fuel supply. Thus, there is further versatility in operating the burner first as a burner to melt or preheat solid charges, or merely to add extra heat to a molten charge, and later in the refining period, shutting off the fuel and using the burner as an oxygen injection lance. In this event, there is the advantage of not having to remove one burner and replace it with a lance. Furthermore, there is the added advantage of varying the relative position of the bluff body such that the oxygen may be jetted into the bath with sufficient axial velocity to penetrate the slag without such undue velocity as would produce excessive splashing. That is, there is the option of injecting the oxygen as a substantially solid jet corresponding to the pencil flame, or as an annular jet corresponding to the lower axial velocities produced in the umbrella or ball shaped flame.

From the foregoing description it will be apparent that the present burner is exceedingly versatile in its modes of operation and in the methods of use in various types of furnaces. In addition, it will be obvious that numerous modifications are possible including, for example, reversing the use of passages 48 and 49 such that oxygen flows down passage 48 and fuel flows down 49. Of course, in this event the relative gas pressures and/or the nozzle geometry must be adjusted so that the velocity in diverging nozzle 80 is greater than that in axial nozzle 76. Obviously, this is necessary in order for the resultant mixture to have the required radial component of velocity so as to form the umbrella and ball shapes.

Other obvious modifications include reversing the direction of coolant flow, however, it has been found that the illustrated flow patterns produce the optimum cooling of the jacket ring and bluff body. Nevertheless, it is to be understood that the foregoing description is intended to be only illustrative of one embodiment of the invention, and that the true invention is not intended to be limited other than as expressly set forth in the following claims.

What is claimed is:

1. The method of operating a metallurgical furnace comprising the steps of:
   (a) charging said furnace with at a least a partly solid charge,
   (b) positioning a variable flame oxygen-fuel burner vertically about said charge,
   (c) adjusting said burner to produce a wide, annular flame and so operating said burner to directly heat a large circular area of said charge, and
   (d) maintaining said annular flame in contact with said charge to cause melting of said charge to form a pool of molten metal with a covering slag layer,
   (e) subsequently adjusting said burner to produce a more narrow flame having a higher axial velocity than said wide flame, said narrow flame readily penetrating said slag layer to directly contact said molten metal thereby permitting more rapid chemical changes in said molten metal by varying the oxygen to fuel ratio in said burner.

2. The method as claimed in claim 1 wherein step (d) includes lowering the burner as said solid charge is melted so as to maintain said wide flame in direct contact with said solid charge.

3. The method of producing steel in a basic oxygen furnace comprising:
   (a) charging said furnace with at least a partly solid charge,
   (b) positioning an oxygen/fuel burner having a variable position orifice vertically above said charge,
   (c) first operating said burner to produce a wide, annular flame and thereby heating a large, circular area of said solid charge, to cause melting of said charge to form a pool of molten metal with a covering slag layer;
   (d) subsequently increasing the oxygen to fuel ratio and adjusting the burner orifice to produce a more narrow flame having a higher axial velocity than said wide flame, said narrow flame readily penetrating said slag layer to directly contact said molten metal thereby permitting more rapid chemical changes in said molten metal.

4. The method as claimed in claim 3 wherein step (d) comprises adjusting the oxygen to fuel ratio so as to substantially terminate fuel injection thereby operating the burner to inject only oxygen and, adjusting the burner orifice to produce a jet of oxygen having maximum slag penetration while producing minimum splashing of the molten charge.

References Cited

UNITED STATES PATENTS

| Re. 26,364 | 3/1968 | Kurzinski | 75—43 |
|---|---|---|---|
| 3,232,748 | 2/1966 | Rinesch | 75—43 X |
| 3,346,190 | 10/1967 | Shepherd | 75—60 X |
| 3,627,295 | 12/1971 | Doi | 75—59 X |
| 3,224,679 | 12/1965 | Kear et al. | 239—132.3 |
| 3,347,660 | 10/1967 | Smith et al. | 75—43 |
| 3,234,011 | 2/1966 | Rinesch | 75—60 |
| 2,829,960 | 4/1958 | Vogt | 75—60 |

CHARLES N. LOVELL, Primary Examiner

J. E. LEGRU, Assistant Examiner

U.S. Cl. X.R.

75—43, 59

PO-1050
(5/69)

UNITED STATES PATENT OFFICE
CERTIFICATE OF CORRECTION

Patent No. 3,725,040                    Dated April 3, 1973

Inventor(s)  Robert D. Jones

It is certified that error appears in the above-identified patent and that said Letters Patent are hereby corrected as shown below:

In the Specification:

Column 1, line 26, the word "innovation" should read --innovations--;

Column 1, line 53, Patent No. "3,234,670" should read --3,224,670--;

Column 1, line 59, the word "severly" should read --severely--;

Column 2, line 32, the word "shewning" should read --showing--;

Column 2, line 71, numeral "20" should read --26--.

In the Claims:

Column 6, line 15, the word "about" should read --above--.

Signed and sealed this 2nd day of July 1974.

(SEAL)
Attest:

EDWARD M. FLETCHER, JR.             C. MARSHALL DANN
Attesting Officer                   Commissioner of Patents